United States Patent [19]

Carpenter

[11] Patent Number: 4,640,125
[45] Date of Patent: Feb. 3, 1987

[54] ROTARY METERING DEVICE USEFUL WITH ABRASIVE FLUIDS

[75] Inventor: Frank Carpenter, Lake Charles, La.

[73] Assignee: Lake Charles Instruments, Inc., Lake Charles, La.

[21] Appl. No.: 721,075

[22] Filed: Apr. 8, 1985

[51] Int. Cl.$^4$ .............................................. G01F 3/04
[52] U.S. Cl. ...................... 73/259; 418/178
[58] Field of Search ............... 73/259; 418/178, 179

[56] References Cited

U.S. PATENT DOCUMENTS

| | | | |
|---|---|---|---|
| 2,207,182 | 7/1940 | Smith . | |
| 2,263,145 | 11/1941 | Smith . | |
| 3,044,687 | 7/1962 | Davey | 418/178 |
| 3,552,895 | 1/1971 | Bayley | 418/178 |
| 3,683,694 | 8/1972 | Granberg | 73/259 |
| 3,712,767 | 1/1973 | Beutter | 418/178 X |
| 3,910,734 | 10/1975 | Telang | 418/178 |
| 4,094,618 | 6/1978 | Kakui et al. | 418/178 |
| 4,123,205 | 10/1978 | Peleschka et al. | 418/178 X |
| 4,502,856 | 3/1985 | Frank | 418/178 X |

*Primary Examiner*—Herbert Goldstein

*Attorney, Agent, or Firm*—Browning, Bushman, Zamecki & Anderson

[57] ABSTRACT

The present invention is directed to an apparatus useful for measuring the flow of an abrasive fluid. The present invention comprises a rotary metering device particularly useful for the measurement of oil well production fluids including sand and other abrasive materials. The present invention comprises a rotary metering device for repetitively producing a measuring chamber by the shuttle movement of a plurality of symmetrically disposed blades through slots in a rotor body into and out of a fluid flow channel between the rotor body and its housing. The rotor body of the present invention includes slots having surfaces comprised of a highly wear resistant metal, preferably having a hardness between about 40 and about 70 on the Rockwell C hardness scale to increase the service life of the meter. In a more preferred embodiment, the surface of the cooperating blades is also comprised of a metal having a high wear resistance, also preferably between about 40 and about 70 on the Rockwell C hardness scale, but less than that of the cooperating slot surface.

13 Claims, 6 Drawing Figures

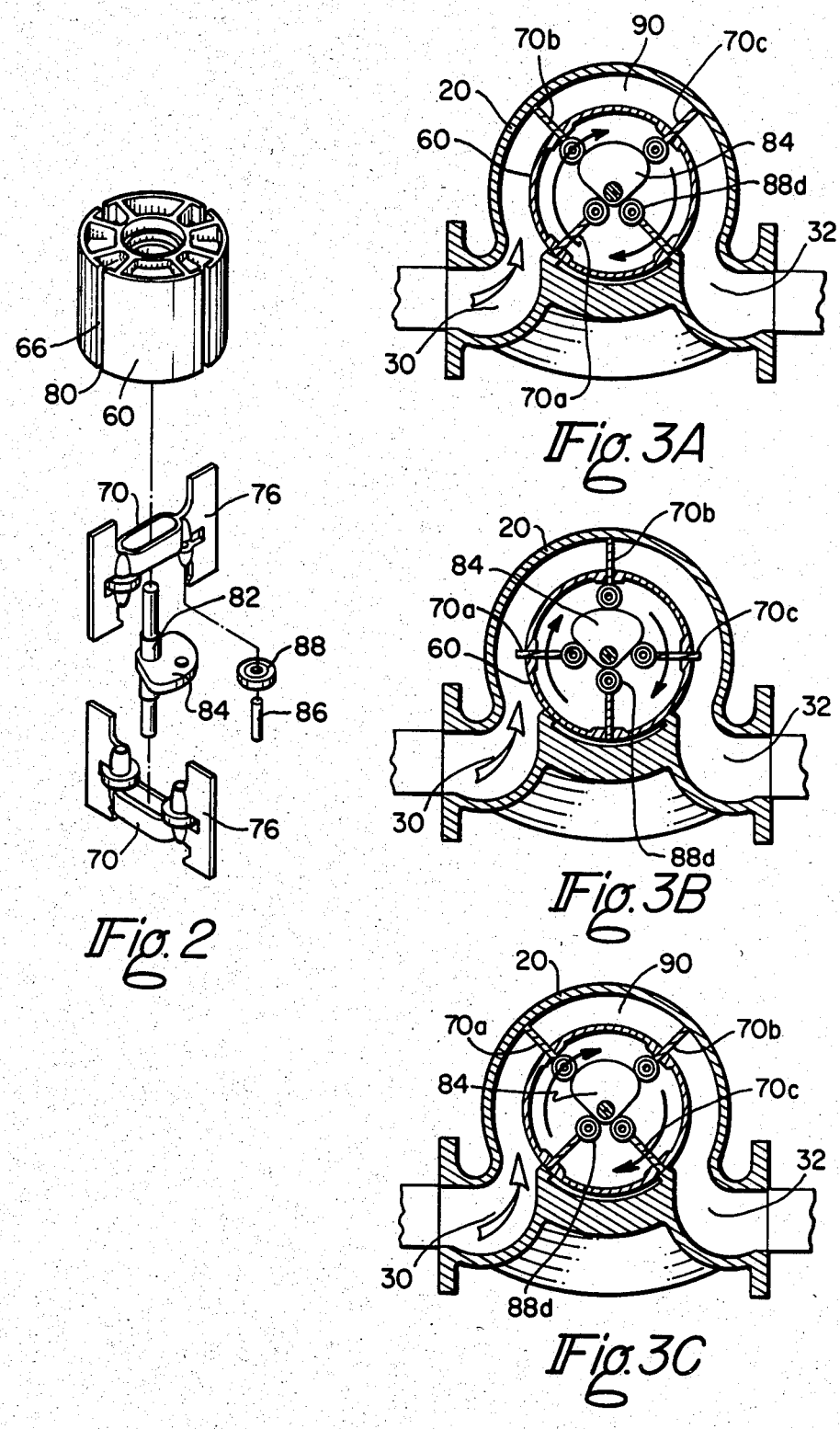

ROTARY METERING DEVICE USEFUL WITH ABRASIVE FLUIDS

BACKGROUND OF THE INVENTION

1. Field of the Invention

The present invention generally relates to an apparatus useful for measuring the flow of an abrasive fluid. The present invention comprises an apparatus and method of constructing the same particularly useful in the measurement of petroleum liquids flowing from a well head and contaminated with sand or other abrasive materials.

2. Description of the Background

The need for accurate, reliable and durable rotary metering devices for measuring the flow of fluids is well established. Those associated with the oil and gas industry are well aware that it is critical to continuously and accurately measure the flow of petroleum liquids from remote well sites. The devices used for these measurements must be accurate, reliable and durable. Further, because sand and other abrasive materials are often suspended within the produced fluids, these metering devices are prone to failure. The continuous and accurate operability of these devices is critical to the correct measurement of well production. Failure can prove exceedingly expensive in both inaccurate production totals and lost production time. Therefore, accurate, reliable and durable metering devices are a necessity.

The most widely used metering devices employ rotary flow mechanisms based on those disclosed by R. S. Smith in U.S. Pats. Nos. 2,207,182 and 2,263,145, the disclosures of which are incorporated herein by reference. Flowmeters based on these disclosures have been widely adopted throughout the oil and gas industry. The rotor and housing of these meters are typically manufactured from cast iron. Because it was desirable to have lightweight blade mechanisms with these meters, aluminum blades have typically been employed. However, these meters are prone to failure in oil fields producing fluids having high levels of sand or other abrasive materials. Sand and other abrasive materials carried by the well fluids have caused rapid deterioration of these meters resulting in inaccurate production totals and lost production. A particularly troublesome failure point is the rapid deterioration of the fit of the metering blades and the slots in the rotor through which the blades move. The tolerance at this interface is rather small and is particularly subject to rapid erosion when metering fluids containing high levels of sand or other abrasive materials. The presence of sand or other abrasive materials within the well fluids increases the rate at which this gap erodes, thus shortening the useful life of the meter. In fields producing particularly abrasive well fluids, these meters often provide satisfactory operation for only a few months before needing repair or replacement. This rapid deterioration results in inaccurate production totals, lost production and the necessity that the meter be repaired or replaced. These meters are typically repaired by replacing the rotor and/or blades with newly manufactured parts or by installing an entirely new meter. Accordingly, frequent repair or replacement is both time consuming and expensive. However, the more significant economic loss often results from the inaccurate metering of the production fluids and from the loss of production during the repair of the meter.

Accordingly, there has been a long felt but unfulfilled need within the industry for an accurate, reliable and durable metering device, particularly for a long-lasting device useful for metering production fluids containing sand or other abrasive materials.

SUMMARY OF THE INVENTION

The present invention provides a new and improved apparatus useful for measuring the flow of abrasive fluids through a pipe. Further, the present invention provides in improved, long-lasting measuring device particulary useful in metering production fluids having high levels of sand or other abrasives from remote well sites.

A rotary metering device in accord with the present invention comprises a cylindrical housing within which is mounted a cylindrical rotor body for rotation about an axis parallel to the axis of the housing. A flow channel through the housing between an inlet and an outlet port is defined by the exterior of the rotor body and the interior of the housing. The rotor body includes a plurality of slots through its cylindrical surface, the slots symmetrically disposed and parallel to the axis of the rotor body. The device comprises a plurality of blades mounted for shuttle movement transversely of the flow channel and through the slots. Finally, the device includes means for moving these blades through the slots into and out of the flow channel to repetitively produce a measuring chamber of predetermined volume within the flow channel.

Increased meter life and durability is achieved by employing a metal of high wear resistance on the exposed surfaces of the slots formed by the rotor body. Preferably, this metal comprises only thin plating over the base material from which the rotor body is constructed. Greatly improved wear resistance is achieved by employing a metal having a Rockwell C hardness greater than 40, preferably between about 40 and about 70, as the metal forming the exposed surface of the slots. Metals of choice include nickel and chromium which are plated over a rotor body of a base metal by conventional electrochemical, electrolytic or electrodeless plating processes. Further improvement is achieved by heat treating the nickel plated surfaces by conventional heat treating techniques to further increase the hardness thereof. Still greater wear resistance is achieved by employing similar wear resistance metals for the corresponding surfaces of the moving blades. Again, the preferred metals are plated by conventional techniques onto a base material from which the blade assembly was constructed. A particularly advantageous device is produced when both the rotor body and blades are nickel plated and only the rotor body is heat treated.

A metering device in accord with the present invention provides an accurate, reliable, durable, wear-resistant and long-lasting metering device particularly useful for the metering of abrasive fluids or fluids containing abrasive materials, e.g., production fluids containing sand or other abrasive materials. Meters in accord with the present invention have proven surprisingly durable and troublefree even when employed with abrasive, sand-bearing oils. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein:

FIG. 2 is an assembly illustration of some of the major components of the rotor body and blade assembly of the rotary meter device of FIG. 1;

FIGS. 3A, 3B and 3C are schematic cross-sectional illustrations of a rotary meter device in accord with FIG. 1 illustrating the movement of the blades to form the measuring chamber as the rotor turns.

Figure 1:
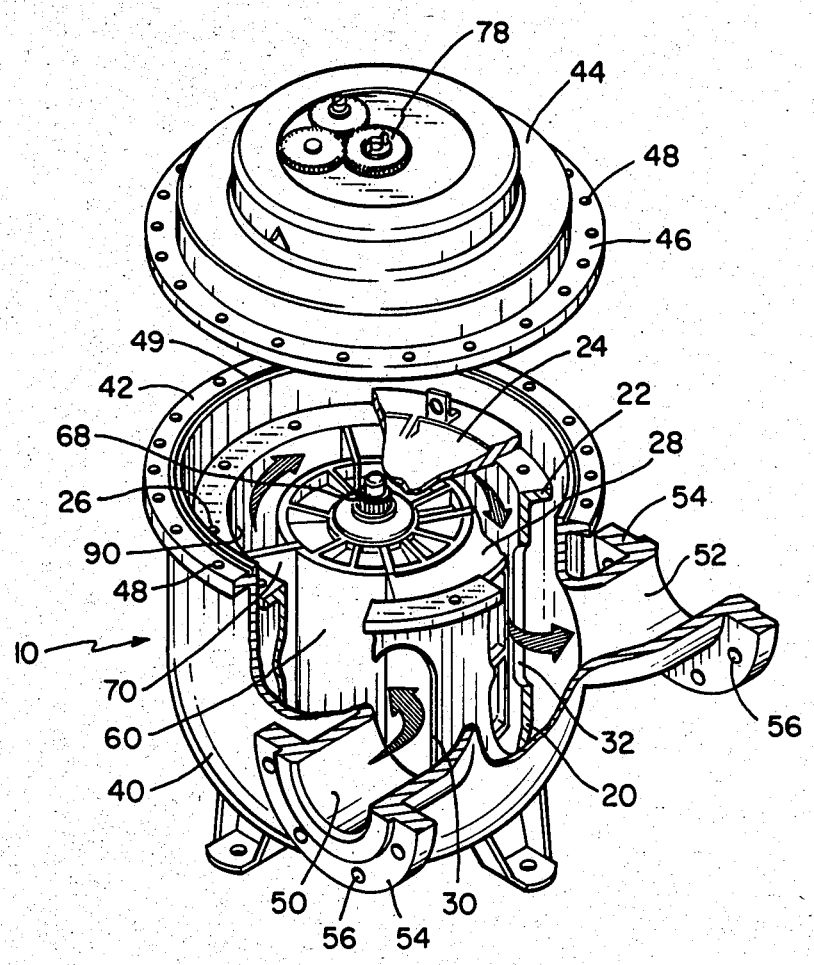
FIG. 1 is a perspective illustration of a rotary metering device, partially cutaway for improved clarity of illustration.
Figure 4:
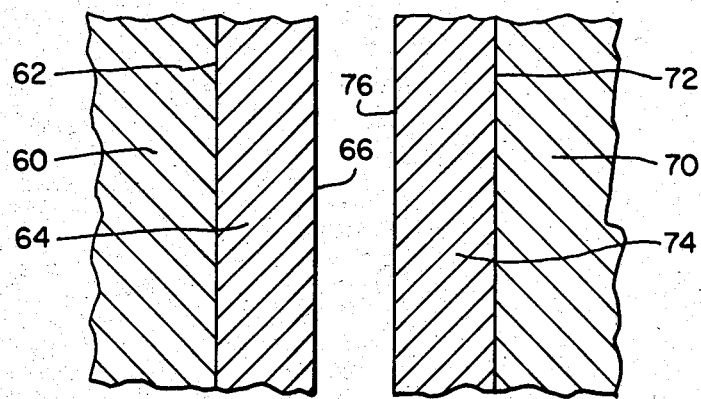
FIG. 4 is a cross-sectional illustration of a portion of a rotor body and blade of a rotary meter device of the present invention, illustrating the presence of a thin, plated layer of a wear-resistant metal on the contact surfaces of the blade and rotor body.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

The present invention is directed to an apparatus for measuring the flow of fluid and is particularly useful for measuring the flow of abrasive liquids. Further, the present invention contemplates a method of producing such a device.

The figures illustrate an apparatus which may be constructed in accord with the present invention. A rotary meter 10 may be constructed as illustrated with a double housing for safety. A meter 10 includes an outer housing 40 of generally cylindrical shape having a flange 42 at one or both ends for sealing engagement with an end plate 44 also flanged 46 about its periphery. Bolts or other conventional fastening means (not shown) are fastened through a plurality of cooperating and symmetrically disposed bores 48 in the flanges 42 and 46. Sealing is achieved by any conventional means, e.g., an O-ring (not shown) in groove 49, between the fastened flanges. The outer housing further includes an inlet connection 50 and an outlet connection 52. Both connections include flanges 54 having symmetrically disposed bores 56 therethrough permitting the meter 10 to be disposed in a pipe string by any conventional sealing and fastening means.

The actual rotary metering device is contained within a cylindrical housing 20 disposed within safety housing 40. Cylindrical housing 20 has a flange 22 at one or both ends for sealing engagement by conventional O-ring or other sealing means with end plates 24 using bolts or other conventional fastening devices (not shown) placed through bores 26 in the flanges 22. The cylindrical housing 20 includes an inlet port 30 and an outlet port 32 in fluid communication with the inlet port 50 and the outlet port 52, respectively, of the outer housing 40. Disposed within the cylindrical housing 20 is a cylindrical rotor body 60 on conventional bearing means for rotation about an axis parallel to the axis of the housing 20. Preferably, the axes of the cylindrical rotor body 60 and the cylindrical housing 20 are coincident. Such a configuration, together with block 28 produces a flow channel from the inlet port 30 to the outlet port 32 defined by the exterior of the rotor body 60 and the interior of the housing 20. The cylindrical rotor body 60 is characterized by a plurality of symmetrically disposed slots 80 about its periphery. Preferably, four such slots 80 are disposed symmetrically and parallel to the axis of the cylindrical body 60. Disposed within the cylindrical body 20 and about an axle 82 are upper and lower blade assemblies 70, each comprising a pair of interconnected blades disposed relative to one another at 180°. The blades 70a, 70b, 70c and 70d are sized for cooperation with the slots 80 of the cylindrical rotor body 60. The blades are disposed to move through the slots 80 transversely of the flow channel to alternately completely block and be completely removed from the flow channel. Each blade makes one complete cycle during each revolution of the rotor body. The clearance between the exposed outer surface 66 of the cylindrical body 60 forming the slot 80 and the exposed side surface 76 of the blade 70 should be not more than about 0.003–0.007 inch for proper operation of the meter. The blade assemblies 70 include cam followers 88 mounted on axles 86 for cooperation with an eccentric cam 84 mounted on the main axle 82. For ease of understanding the operation of the rotor body 60 and blade assemblies 70, a portion of this structure is illustrated in the partial assembly drawing in FIG. 2.

The operation of the meter of the present invention is schematically and simply illustrated in FIGS. 3A, 3B and 3C. Liquid enters the flow channel produced between the housing 20 and the rotor body 60 through an inlet port 30. This entering liquid impinges upon fully extended blade 70b to cause rotation of the rotor body 60 and the blade assemblies 70 about the axle 82. Liquid which has previously entered the flow channel and is disposed between fully extended blades 70b and 70c is measured in measuring chamber 90. Further impingement of the entering fluid upon fully extendable blade 70b causes rotation of the rotor body 60 and blade assemblies 70 to the position as illustrated in FIG. 3B. This rotation causes the cam followers 88 moving about the eccentric cam 84 to begin the extend blade 70a into the flow channel from its initially fully retracted position while corresponding blade 70c, initially fully extended, begins to retract. Accordingly, the measuring chamber 90 is opened on the outlet side permitting the measured fluid to leave the device through outlet port 32. Further impingement of fluid continues rotation of the rotor body 60 and blade assembly 70 to the position illustrated in FIG. 3C where a new measuring chamber 90 has been formed between fully extended blades 70a and 70b. The rotation of the rotor body 60 and consequent repetitive formation of the measurement chamber 90 and measurement of the fluid therein is recorded by a conventional digital recorder or other device (not shown) driven through gears 78 by rotation of the rotor body 60.

Rotary meters constructed in accord with that illustrated and described will suffer wear at the exposed surfaces of the rotor body 60 forming the slots 80 and on the blade surfaces 76 of the blade assemblies 70. Shuttle movement of the blades 70 transversely of the flow channel and through the slots 80 produces wear on the adjacent surfaces of the blade and slot. This wear is particularly troublesome when measuring abrasive fluids, e.g., well fluids such as petroleum liquids containing sand and other abrasive materials. Accordingly, metering devices used in the oil field have particularly short lives.

The above device is greatly and unexpectedly improved when the exposed surface of the slots 80 in the rotor body 60 are comprised of a metal of high wear resistance. Preferably, such a metal should have a wear resistance greater than 40 on the Rockwell C hardness scale and preferably between about 40 and about 70 on that scale. The metal of preference is nickel, although chromium is also satisfactory. Even more preferable is nickel which has been heat treated by conventional means to increase its hardness further. Because such metals are expensive, the prferred device employs a thin layer 64 of such a metal bonded by conventional means to the surface 62 of the rotor 60. These thin layers are typically not more than about 0.005 inch thick and may be produced by conventional electrochemical, electrolytic or electrodeless plating techniques. In a further improvement, the exposed surface 76 of the blade assembly 70 is also comprised of a material of high wear resistance, but prferably a material not as hard as that of the corresponding slot surface of the rotor body. In a most preferred embodiment, the surface 66 of the slot 80 of the rotor body 60 is comprised of a thin, plated layer of heat treated nickel while the corresponding surface 76 of the blade 70 is comprised of a thin, plated layer 74 of nickel bonded to the blade surface 72 by conventional means.

The foregoing description of the invention has been directed in primary part to a particular preferred embodiment in accord with the requirements of the patent statutes and for purposes of explanation and illustration. It will be apparent, however, to those skilled in the art that many modifications and changes in the specifically described apparatus may be made without departing from the scope and spirit of the invention. Although Applicant believes the disclosed apparatus provides the most advantageous use of the present invention, the invention is not restricted to the particular form of construction illustrated and described, but covers all modifications which may fall within the scope of the following claims.

It is Applicant's intention in the following claims to cover such modifications and variations as may fall within the true spirit and scope of the invention.

What is claimed is:

1. An apparatus useful for measuring the flow of abrasive fluids through a pipe, comprising:
    a cylindrical housing having inlet and outlet ports through which the flow of a fluid may be directed;
    a cylindrical rotor body mounted within said housing for rotation about an axis parallel to the axis of said housing;
    a flow channel through said housing between said inlet and outlet ports defined by the exterior of said rotor body and the interior of said housing;
    a plurality of slots through the cylindrical surface of said rotor body, wherein said slots are disposed symmetrically about said rotor body and parallel to the axis of said rotor body, wherein the exposed surfaces of said slots formed by said rotor body comprise a metal of high wear resistance and wherein the hardness of said metal is between 40 and about 70 on the Rockwell C hardness scale;
    a plurality of blades mounted for shuttle movement transversely of said flow channel and through said slots wherein the hardness of the surface of said blades opposing the exposed surfaces of said slots is between about 40 and about 70 on the Rockwell C hardness scale and less than the hardness of said metal; and
    means for moving said blades through said slots as said rotor body rotates to repetitively produce a measuring chamber of predetermined volume within said flow channel.

2. The apparatus of claim 1 wherein the wear resistance of said metal is greater than the wear resistance of cast iron.

3. The apparatus of claim 1 wherein said metal is nickel.

4. The apparatus of claim 3 wherein said nickel surfaces have been heat treated to increase the hardness of said surfaces.

5. The apparatus of claim 4 wherein the surfaces of said blades opposing said heat-treated surfaces of said slots are nickel.

6. The apparatus of claim 1 wherein said metal is chromium.

7. The apparatus of claim 1 wherein said exposed surface is a thin layer of high wear resistant metal plated on the surface of said rotor body.

8. The apparatus of claim 7 wherein said metal is nickel.

9. The apparatus of claim 8 wherein said nickel surfaces have been heat treated to increase the hardness of said surfaces.

10. The apparatus of claim 9 wherein the surfaces of said blades opposing said heat-treated surfaces of said slots are nickel.

11. The apparatus of claim 7 wherein said metal is chromium.

12. The apparatus of claim 7 wherein said thin layer of wear resistant material is no more than about 0.005" thick.

13. The apparatus of claim 1 wherein the wear resistance of the surfaces of said blades opposing the exposed surfaces of said slots is less than the wear resistance of said exposed surfaces.

* * * * *